3,150,100
SOLS OF ZIRCONIA AND HAFNIA WITH ACTINIDE OXIDES

Frederick T. Fitch and Jean G. Smith, Baltimore, Md., assignors to W. R. Grace & Co., a corporation of Connecticut
No Drawing. Filed Feb. 27, 1962, Ser. No. 176,152
7 Claims. (Cl. 252—301.1)

This invention relates to stable sols of particles composed of actinide metals and zirconia or hafnia as an intimate mixture or as solid solution oxide phases and the method for preparing these sols. In one particular embodiment, the invention relates to the method of preparing stable zirconia-urania sols and to these sols as compositions of matter.

In the preparation of high-temperature ceramic nuclear elements, sols with particles composed of zirconia and actinide oxides offer advantages as a fuel source due to the fine particulate actinide oxide dispersion. Other improvements result from the physical properties of the ceramic materials prepared with these colloidal materials. The zirconia-actinide oxide composition may be used to stabilize certain of the actinide oxide fuels. The sols of our invention are incorporated into the fuel elements by adding the sols to the other components to form a paste which is subsequently fired. Alternately, the sols may be reduced to powder form and added to the other components using the standard technique common in the ceramics industry. The powders can be prepared from the sols by vacuum evaporation or by any of the other conventional techniques.

One of the problems which is encountered in the preparation of fuel elements is the instability of the actinide oxides. Uranium dioxide, for example, when heated in air will transform to $U_3O_8$. The compound $UO_2$, as it is conventionally prepared, has a fluorite crystal structure. When the $UO_2$ adsorbs oxygen, the fluorite structure is stable until the composition reaches approximately $UO_{2.3}$ (this fluorite structure is reportedly also stable down to composition $UO_{1.75}$). Above $UO_{2.3}$ the fluorite structure breaks down. The volume expansion of the $UO_2$ transforming to $U_3O_8$ may disrupt the fuel elements and permit escape of fission products. In addition to these problems, the $U_3O_8$ has appreciable vapor pressure at temperatures in excess of 1200° C. which causes loss of part of the fuel in the system due to vaporization. The need for stable high temperature nuclear fuel requires a prevention of the $UO_2$–$U_3O_8$ transformation.

One of the principal uses of the material prepared by the process of our invention is the preparation of reactor fuel elements which resist oxidation with its undesirable consequences. This is accomplished by forming zirconium dioxide in conjunction with the actinide oxides to stabilize the fluorite structure. This is possible because in the systems zirconia with actinide oxides, such as urania or plutonia, the ionic radii favor solid solution formation. Zirconia has a stabilizing effect by inhibiting destruction of the fluorite structure by the conversion of $UO_2$ to $U_3O_8$, for example. The presence of zirconia is well tolerated in nuclear fuel elements because of its high melting point and low cross section. Although hafnia could be similarly used to stabilize $UO_2$, its high cross section would preclude its inclusion in nuclear fuels.

The process and product of our invention have the added utility of preventing loss of fuel elements from nuclear reactors due to volatility associated with oxidized urania. If $UO_2$ is stabilized using the process and products described below, there is no problem with loss because there is no transformation of uranium dioxide to the volatile $U_3O_8$. These problems are not of prime importance in ceramic elements where thoria is the principal component since these crystal changes do not occur. For that reason, we do not include thoria as one of the components in the product or as one of the reactants in the process of our invention.

We have found that stable, dense spherical particles composed of two oxides, where one of the oxides is an actinide oxide and the other is zirconia or hafnia, can be prepared by alternate processes which comprise autoclaving active previously formed sols of zirconia or hafnia and actinide oxides at temperatures above 100° C. for a period of time sufficient to insure interaction of the sols. These sols are then treated by particle separation and redispersion in deionized water to remove the electrolytes and the product is recovered. The active sols which are used in preparing our mixed sols are formed individually. The sols prepared by this process are also disclosed as new compositions of matter.

One of the components of our sols is either hafnia or zirconia, the other component is the actinide oxide. We do not intend to include all of the actinide oxides in our definition. Our term includes the oxides of the quadrivalent actinide metals above uranium in the periodic table, such as plutonium, americium, curium, etc. We do not include the elements below uranium in our classification of the actinide metals.

We have discovered a method of preparing hydrous oxides of zirconia, hafnia, and actinide oxides mentioned above in the form of individual aquasols which are stable in concentrations up to 30% solids and at temperatures up to 200° C. These new aquasols are novel and have very useful properties. The principal use contemplated for these sols is in the preparation of ceramic fuel elements as stated above. For purposes of simplicity, our process will be described using a system zirconia-urania; however, we intend to include hafnia-urania where low nuclear cross section is not a factor.

Broadly stated, the process of our invention comprises the preparation of sols of zirconia or hafnia-urania by mixing active sols of the component oxides and autoclaving, by mixing the active sol of either component oxide with a non-oxidizing soluble salt solution of the other oxide and autoclaving, or by mixing non-oxidizing, soluble salt solutions of both components and autoclaving. The method of preparing the active sols is not part of this invention. They are most conveniently prepared by the previously disclosed techniques of electro-dialysis, ion-exchange, or peptization. Sols in the active state are sols that have not been treated by any hydrothermal step which would cause alteration of the sol structure so as to lower sol reactivity. This is an important limitation on our process, since any of the zirconia, hafnia, or actinide oxide sols rendered sufficiently inactive by heating will not take part in the reactions. The uranous and zirconyl solutions referred to above are best prepared from the corresponding chlorides although any soluble, non-oxidizing salts of these ions could be used.

Autoclaving is done in a nitrogen atmosphere to inhibit oxidation of quadrivalent uranium. From about 2 up to about 40 hours at 100–200° C. are required to complete zirconia-urania interaction. Preferred conditions are 20 hours at 150° C. Zirconia-urania sols may be prepared over the entire range of compositions, but single phase, face-centered cubic solid solutions will be obtained only when the zirconia or hafnia content is below 40 mole percent and the actinide oxide content is above 60 mole percent.

When the electrolyte content is high, the product after autoclaving is obtained as a floc. Electrolytes are conveniently removed by decanting the supernatant and redispersing the floc in sufficient water to give the desired concentration. These sols are stable up to about 30 weight percent solids. Zirconia-urania sols which do not floc in preparation may be deionized by mixing with certain commercial ion-exchange resins. These sols may then be concentrated by vacuum evaporation or by centrifugation followed by redispersion to any desired concentration up to about 30 weight percent solids.

Particle characteristics of the product sols are determined by electron microscopy. By this method, particle diameter of zirconia-urania have been found to vary from about 10 to about 120 millimicrons. These particles are tightly packed aggregates of subparticles averaging 3 to 10 millimicrons in size. These particles are seen to be of homogeneous composition even though the lattice constants may not indicate complete solid solution formation. In such cases, the particles are undoubtedly intimate mixtures of crystalline and amorphous material which are completely converted to zirconia-urania solid solution by separating out the solid phase and heating in an inert or reducing atmosphere at above 400° C. This is a far lower temperature than the 1400° C. or higher usually required to obtain solid solutions in conventional ceramics work.

The invention is further illustrated by the following specific but non-limiting examples.

*Example I*

A mixed uranous-oxychloride-zirconyl chloride solution was prepared by adding 24 ml. of a uranous oxychloride solution containing the equivalent of 5 grams of $UO_2$ per 100 ml. to 4.6 ml. of zirconyl chloride solution containing the equivalent of 3 grams of $ZrO_2$ per 100 ml. The uranous oxychloride solution was obtained by electrolytic reduction and electrodialysis of aqueous uranyl chloride. The mixture was diluted with deionized water to a total volume of 120 ml. The total oxide concentration at this point was 1.14 grams per 100 ml. The oxide composition was 20 mole percent $ZrO_2$ and 80 mole percent $UO_2$. The solution was sealed into a glass pressure vessel under nitrogen and autoclaved 20 hours at 150° C. without agitation. A blue-black product sol was obtained. The properties before and after autoclaving were as follows:

| | Before autoclaving | After autoclaving |
| --- | --- | --- |
| pH | 1.31 | 0.98 |
| Specific conductance (mhos/cm.) | $3 \times 10^{-2}$ | $5.3 \times 10^{-2}$ |

The sol was deionized and concentrated by centrifuging, decanting and redispersing in a minimum of deionized water.

The sol was examined by electron microscopy. The electron micrograph showed particles averaging 50 millimicrons in diameter formed by chaining 75 millimicron subparticles into open centered rings or squares.

It is apparent from these data that a mixed urania-zirconia sol can be prepared using the technique described above.

*Example II*

In this example, the sol was prepared using an alternate technique.

A 24 ml. volume of uranous oxychloride solution containing the equivalent of 5.0 grams of $UO_2$ per 100 ml. was mixed with 4.6 ml. of 3 to 7 millimicron particle size reactive zirconia sol containing 3 grams $ZrO_2$ per 100 ml. The mixture was then diluted with deionized water to a total volume of 120 ml. As in Example I the total oxide concentration was 1.14 grams per 100 ml. The oxide composition was 20 mole percent $ZrO_2$ and 80 mole percent $UO_2$. The zirconia sol used in this experiment was obtained by electrodialysis of aqueous zirconyl chloride. The mixed chloride solution was sealed into a glass pressure vessel under nitrogen and autoclaved 20 hours at 150° C. without agitation. A blue black sol was obtained. Properties before and after autoclaving were as follows:

| | Before autoclaving | After autoclaving |
| --- | --- | --- |
| pH | 1.29 | 0.90 |
| Specific conductance (mhos/cm.) | $3.3 \times 10^{-2}$ | $6.2 \times 10^{-2}$ |

The sol was deionized and concentrated by centrifuging, decanting, and redispersing in a minimum of deionized water.

The electron micrograph showed the product sol to consist of spherical particles 10 to 35 millimicrons in diameter formed by aggregates of 5 millimicron subparticles. The particles were uniformly dense and homogeneous in composition. X-ray data indicated solid solution formation by virtue of a shift in the cell constant from 5.42 angstroms for pure uranous oxide sol to 5.38 angstroms for the mixed oxide sol. This method is an alternate method of making zirconia-urania sol. It should be noted that the particle size of the final product is slightly larger than the particle size of the sol particles when prepared by the technique of Example I.

*Example III*

The technique of Example I was investigated by the preparation of a sol containing 50 mole percent zirconia and 50 mole percent urania.

In this run a 26.2 ml. volume of uranous oxide sol containing 4.6 grams of $UO_2$ per 100 ml. was mixed with 11 ml. of zirconyl chloride solution containing the equivalent of 5.0 grams of $ZrO_2$ per 100 ml. The mixture was then diluted with deionized water to a total volume of 120 ml. Total oxide concentration was 1.14 grams per 100 ml. Oxide composition was 50 mole percent $ZrO_2$ and 50 mole percent $UO_2$. The uranous oxide sol used in this experiment was obtained by hydrolysis of uranous chloride solution with urea. The chloride solution-sol mixture was sealed into a glass pressure vessel under nitrogen in an autoclave for 20 hours at 150° C. without agitation. A dark green colored sol was obtained. Properties before and after autoclaving were as follows:

| | Before autoclaving | After autoclaving |
| --- | --- | --- |
| pH | 1.75 | 1.23 |
| Specific conductance (mhos/cm.) | $1.1 \times 10^{-2}$ | $2.2 \times 10^{-2}$ |

The sol was deionized and concentrated by centrifuging, decanting, and redispersing in a minimum of deionized water. The product was examined by electron microscopy. The electron micrograph showed the product sol to consist of spherical particles 20 to 60 millimicrons in diameter which were aggregates of 5 millimicron subparticles. The parent uranous oxide sol from which this mixed oxide sol was prepared was composed of 15 to 45 millimicron cubic and spherical aggregate particles. The slightly increased size of the mixed oxide sols suggests an interaction between urania and zirconia, in this case by penetration of the zirconyl chloride into the $UO_2$ aggregate particles. X-ray diffraction studies indicated no change in cell constants. On the basis of this X-ray data it was apparent that the particles contained amorphous zirconia, universally dispersed within the resulting mixed oxide particles.

*Example IV*

A mixed zirconia-urania sol was prepared by the technique of preparing sols of both components, and then mixing and autoclaving to interact them.

In this run a 30.1 ml. volume of fine-sized reactive uranous oxide sol containing 4 grams of $UO_2$ per 100 ml. was mixed with 4.6 ml. of fine-sized reactive zirconia sol containing 3 grams of $ZrO_2$ per 100 ml. The mixture was then diluted with deionized water to a total volume of 120 ml. The total oxide concentration was 1.14 grams per 100 ml. The composition was 20 mole percent $ZrO_2$ and 80 mole percent $UO_2$. Both the urania and zirconia sols were composed of 3 to 7 millimicron particles obtained by electrodialysis of the respective chloride solutions. The sol mixture was sealed into a glass pressure vessel under nitrogen and autoclaved for 21 hours at 150° C. without agitation. The product was a bright blue sol. The properties before and after autoclaving were as follows:

| | Before autoclaving | After autoclaving |
|---|---|---|
| pH | 3.10 | 2.27 |
| Specific conductance (mhos/cm.) | $7.8 \times 10^{-4}$ | $2.8 \times 10^{-2}$ |

As in the previous run, the product was examined in the electron microscope. The electron micrograph showed the product sol to consist of generally spherical particles ranging up to 60 millimicrons in diameter. The particles were apparently formed by aggregation of 10 millimicron subparticles. The X-ray data showed a single crystalline phase—the face-centered cubic phase. The cell constant was 5.405 angstroms as compared with 5.42 angstroms for uranous oxide sol autoclaved alone. According to the data of Lambertson and Mueller [J. Am. Ceram. Soc. 36, 365 (1953)], with a correction for the interstitial oxygen content of our component uranous oxide sol, this corresponds to an oxide composition of 5 mole percent $ZrO_2$ and 95 mole percent $UO_2$. The remaining $ZrO_2$ was amorphous and intimately associated with the other crystalline phases in the sol particle.

Obviously many modifications and variations of the invention, as herein above set forth, may be made without departing from the essence and scope thereof, and only such limitations should be applied, as indicated in the appended claims.

What is claimed is:

1. A method of preparing sols of oxide elements selected from the group consisting of zirconia and hafnia with oxides of the actinide metals above uranium which comprises preparing a mixed aqueous solution of the two oxides in the desired proportions, heating the mixture to about 100° C. to 200° C. in a non-oxidizing atmosphere for a period of time sufficient to insure sol formation, cooling, concentrating by particle separation and redispersion and recovering the product sol.

2. A process for preparing a zirconia-urania sol which comprises preparing an aqueous solution of a mixture of non-oxidizing, soluble salts of zirconia and urania in the desired proportions, heating the mixture to about 100 to 200° C. in a non-oxidizing atmosphere for a period of time sufficient to insure sol formation, cooling, concentrating the sol by particle separation and redispersion, and recovering the product sol.

3. A process for preparing a zirconia-urania sol wherein the oxides are present as a solid solution phase which comprises preparing an aqueous solution of a mixture of non-oxidizing, soluble salts of zirconia and urania to contain about 0.1 to 99.9 mole percent zirconia and 99.9 to 0.1 mole percent urania, heating the mixture to a temperature of about 100 to 200° C. for a period of 2 to 40 hours in a non-oxidizing atmosphere, cooling, separating the particles by centrifuging, redispersing the particles in a minimum of deionized water and recovering the product sol.

4. A process for preparing a sol of oxides of metals selected from the group consisting of zirconia and hafnia and an actinide metal above uranium in the periodic chart which comprises preparing active sols of the oxides, mixing the sols in the desired proportions, autoclaving the mixed sols at a temperature of about 100 to 200° C. in a non-oxidizing atmosphere for a period of time sufficient to insure particle interaction, treating the sol by solids separation, and redispersion and recovering the product sol.

5. A process for preparing a zirconia-urania sol which comprises preparing active sols of zironia and urania, mixing the sols in the desired proportions, heating the mixed sols for about 20 hours at about 150° C. under nitrogen, cooling, concentrating the sols by particle separation and redispersion, and recovering the product sol.

6. A process for preparing sols of oxides of metals selected from the group consisting of zirconia and hafnia, and an actinide metal above uranium in the periodic chart which comprises mixing a non-oxidizing soluble salt of one of the oxides with an active sol of the other oxide in the desired proportions, autoclaving the mixture at a temperature of about 100 to 200° C. in an inert atmosphere for a period of time sufficient to insure particle interaction, treating the sol by solids separation and redispersion and recovering the product sol.

7. A process for preparing a zironia-urania sol which comprises preparing a mixture of a non-oxidizing soluble salt of one oxide with an active sol of the other oxide in the desired proportions, heating the mixture for about 20 hours at 150° C. under nitrogen, cooling, concentrating the sols by particle separation and redispersion, and recovering the product sol.

References Cited in the file of this patent

UNITED STATES PATENTS

| 2,885,366 | Iler et al. | May 5, 1959 |
| 2,952,641 | McKenzie | Sept. 13, 1960 |
| 2,955,088 | Beerbower | Oct. 4, 1960 |
| 3,024,199 | Pasfield | Mar. 6, 1962 |